United States Patent
Ben Shalom et al.

(10) Patent No.: US 11,520,344 B2
(45) Date of Patent: Dec. 6, 2022

(54) SYSTEMS AND METHODS FOR MANAGING MULTIPLE AUTONOMOUS VEHICLES

(71) Applicant: 634 AI LTD., Neve Ilan (IL)

(72) Inventors: Amir Ben Shalom, Modi'in (IL); Arik Rofe, Maale Ha'hamisha (IL)

(73) Assignee: 634 AI LTD., Neve Ilan (IL)

(*) Notice: Subject to any disclaimer, the term of this patent is extended or adjusted under 35 U.S.C. 154(b) by 0 days.

(21) Appl. No.: 17/430,049

(22) PCT Filed: Sep. 27, 2019

(86) PCT No.: PCT/IB2019/058209
§ 371 (c)(1),
(2) Date: Aug. 11, 2021

(87) PCT Pub. No.: WO2020/165638
PCT Pub. Date: Aug. 20, 2020

(65) Prior Publication Data
US 2022/0083063 A1   Mar. 17, 2022

Related U.S. Application Data

(60) Provisional application No. 62/803,669, filed on Feb. 11, 2019.

(51) Int. Cl.
*G05D 1/02* (2020.01)
*G06V 20/54* (2022.01)
(Continued)

(52) U.S. Cl.
CPC ......... *G05D 1/0214* (2013.01); *G05D 1/0231* (2013.01); *G05D 1/0238* (2013.01);
(Continued)

(58) Field of Classification Search
CPC .. G05D 1/0214; G05D 1/0231; G05D 1/0238; G05D 1/0276; G05D 1/0088;
(Continued)

(56) References Cited

U.S. PATENT DOCUMENTS 5,822,542 A * 10/1998 Smith ............... H04N 5/76
   348/E7.086
5,828,848 A * 10/1998 MacCormack .... G08B 13/1968
   709/247

(Continued)

FOREIGN PATENT DOCUMENTS

CN    109960247 A * 7/2019
KR    20090061355 A * 6/2009
KR    100973016 B1 * 7/2010

OTHER PUBLICATIONS

International Search Report for PCT Application No. PCT/IB2019/058209 dated Dec. 20, 2019, 2 pp.

(Continued)

*Primary Examiner* — Dale W Hilgendorf
(74) *Attorney, Agent, or Firm* — The Roy Gross Law Firm, LLC; Roy Gross

(57) ABSTRACT

Control system and method for managing transport of vehicles in a warehouse. A network of cameras provide coverage over the route way network by capturing images and sending image data to a central control unit which processes the images and generates signals to control the movement of robot slaves. The control system also includes a calibration mechanism to calibrate a map of the network of routes and an obstruction matrix function. The robot slaves include a safety override mechanism to control the robot slaves autonomously and independently in case of detecting an obstacle or an unexpected hazard in a path of its movement along a route of the warehouse network.

14 Claims, 12 Drawing Sheets

(51) Int. Cl.
*G06V 10/22* (2022.01)
*G08G 1/04* (2006.01)
*G08G 1/0968* (2006.01)
*H04N 7/18* (2006.01)
*G05D 1/00* (2006.01)

(52) U.S. Cl.
CPC ......... *G05D 1/0276* (2013.01); *G06V 10/225* (2022.01); *G06V 20/54* (2022.01); *G08G 1/04* (2013.01); *G08G 1/096811* (2013.01); *H04N 7/181* (2013.01); *G05D 1/0088* (2013.01)

(58) Field of Classification Search
CPC ........ G06V 10/225; G06V 20/54; G08G 1/04; G08G 1/096811; H04N 7/181
See application file for complete search history.

(56) References Cited

U.S. PATENT DOCUMENTS

| | | | |
|---|---|---|---|
| 7,386,163 B2 | 6/2008 | Sabe et al. | |
| 7,684,894 B2 | 3/2010 | Sakai et al. | |
| 7,839,289 B2* | 11/2010 | Chung | G08B 13/08 340/572.8 |
| 9,151,692 B2* | 10/2015 | Breed | B60R 21/01536 |
| 9,214,074 B1* | 12/2015 | Fuhr | G08B 13/19613 |
| 10,598,760 B2* | 3/2020 | Seaman et al. | H04N 7/181 348/231.9 |
| 2010/0152944 A1 | 6/2010 | Kouno et al. | |
| 2011/0102634 A1* | 5/2011 | Pardue | H04N 7/181 348/231.9 |
| 2018/0246525 A1* | 8/2018 | Hiramatsu | G05D 1/0276 |
| 2020/0341469 A1* | 10/2020 | Smolyanskiy | G06N 3/04 |

OTHER PUBLICATIONS

International Written Opinion for PCT Application No. PCT/IB2019/058209 dated Dec. 20, 2019, 10 pp.
Takase K et al: "Autonomous mobile robot platform supported by intelligent information infrastructure", Robotics, Intelligent Systems and Signal Processing, 2003. Proceedings 2003 IEEE International Conference on Changshua, Hunan, China Oct. 8-13, 2003, Piscataway, NJ, USA, IEEE, vol. 1, Oct. 8, 2003, pp. 495-500.
Rampinelli Mariana et al: "An Intelligent 1-12 Space for Mobile Robot Localization Using a Multi-Camera System", Sensors, vol. 14, No. 8, Aug. 15, 2014, pp. 15039-15064.
Shim Jae et al: II A Model Robot Localization via Indoor Fixed Remote Surveillance Cameras, Sensors, vol. 16, No. 2, Feb. 4, 2016.
Supplementary European Search Report of Application No. EP 19915338.8 dated Oct. 28, 2022.

\* cited by examiner

SYSTEMS AND METHODS FOR MANAGING MULTIPLE AUTONOMOUS VEHICLES

CROSS REFERENCE TO RELATED APPLICATIONS

This application is a National Phase of PCT Patent Application No. PCT/IB2019/058209 having International filing date of Sep. 27, 2019, which claims the benefit of priority of U.S. Provisional Patent Application No. 62/803,669, filed Feb. 11, 2019, the contents of which are all incorporated herein by reference in their entirety.

FIELD OF THE INVENTION

The disclosure herein relates to systems and methods for providing centralized management of a multiple autonomous vehicles in a known network of route ways. In particular, the system and method enables control of multiple autonomous vehicles even if the autonomous vehicles provide no active feedback.

BACKGROUND

With the technological advancement of robots and autonomous vehicles, their use in warehouse and factory establishments is increasing. The increased sophistication of artificial intelligence has improved robot functionality as well as improved automation that leverages the functionality to implement more complex tasks. A large number of fulfillment and inventory control operations now rely on robots to assist human workers in fulfilling orders.

In a warehouse management and control system, the order fulfillment process is semi-autonomous with tasks distributed between the robots and manual operators. On receiving an order fulfillment request, the robots navigate the distribution site to locate the shelves where each order item is located. The robots lift the delivery items of the customer order from the shelves and deliver it to a manual operator position. The delivery items are then marked with delivery information and sorted (either manually or automatically through robots) in a particular order of the delivery. The items are scanned, packed in delivery boxes and placed in a delivery vehicle. The robots perform one or more of these tasks as per the automation standard of the warehouse.

In the conventional warehouse management and control system, the robots are controlled by a central control system. The robots, while navigating the warehouse site, constantly provides active feedback to the central control system by sending their location information at regular intervals. The central control system then guides these robots for navigating through the site. Each robot need to be equipped with sophisticated cameras and navigation systems which increase their cost and complexity. In case of any error in the camera of the navigation system of a robot, its operation is effected making it useless until repaired. The installing of redundant cameras on each robot makes the whole process extremely costly. Further, any changes to the robots camera or navigation system need to be replicated to the central control system.

In light of the above limitations, it is desirable to have a control system which can be retrofitted to an existing warehouse or network of autonomous robot vehicles and may self-calibrate and control the fleet without requiring extensive changes to the existing hardware. Also, the system should work even when no active feedback is provided by robotic vehicles. The autonomous warehouse management system described herein comes to address this need.

SUMMARY OF THE EMBODIMENTS

In one aspect of the invention, a control system and method are disclosed for managing transport of vehicles in a warehouse or other such network of known route ways. The system may include a central control unit, a multiple cameras, a calibration mechanism, multiple semi-autonomous vehicles or robot slaves and a communication network. It is a particular feature of the system that control may be provided even where no active feedback is provided from the vehicles.

In another aspect of the invention, a system is disclosed for managing the movement of an object within an area, wherein the area comprises a network of routes in a first topology. The system comprises a plurality of image capturing devices located at multiple locations along the network of routes, wherein images of each route of the network and the object being captured by two or more image capturing devices. The image capturing devices comprising a pre-processor unit which processes the captured images and create one or more delta files for each captured image and a transmit unit for transmitting the delta files.

The system further comprises a central control unit which comprises a first communication interface for communicating with the plurality of image capturing devices through a first communication network, wherein the central control unit receives the delta files from the image capturing devices. The central control unit also comprises of a second communication interface for communicating with the object through a second communication network, wherein the central control unit communicates with the object to control its movement along the network of routes. The central control unit further comprises of a processing unit for constructing a map of the network of routes and an obstruction matrix function, wherein the obstruction matrix function indicates the availability and obstruction of various routes of the network at different points of time. The processing unit also generate control signals for controlling the movement of the object within the network of routes.

The system also comprises a calibration mechanism, wherein the calibration mechanism enables the central control unit to calibrate the map of the network of routes and the obstruction matrix function by marking one of more known points along the network of routes. The image capturing devices capture the images of the marked known points, create delta files and transmit the delta files to the central control unit.

In a particular aspect of the invention, the object includes a safety override mechanism to control the object autonomously and independently in case of detecting an obstacle or an unexpected hazard in a path of the object movement along a route of the network. The safety override mechanism comprises a sensing device which enables the object to detect the obstacle or the unexpected hazard in the path and an additional controlling device which enables the object to identify an alternate movement path.

A further aspect of the invention discloses a system for managing the movement of an object within an area, wherein the area is partitioned into a plurality of regions. The system comprises a plurality of image capturing devices located at multiple locations within the area, wherein images of each region of the area and the object being captured by two or more image capturing devices.

The system also comprises a central control unit. The central control unit comprises a first communication interface for communicating with the plurality of image capturing devices through a first communication network, wherein the central control unit receives the captured images of the regions and the object from the image capturing devices. The central control unit further comprises a second communication interface for communicating with the object through a second communication network, wherein the central control unit communicates with the object to control its movement within the area.

The system further comprises a calibration mechanism to mark one of more known points within the area, wherein the image capturing devices capture the images of the marked known points.

In yet another aspect of the invention, the object includes a safety override mechanism to control the object autonomously and independently in case of an event.

A further aspect of the invention discloses a method for controlling the movement of an object within an area, wherein the area comprises a network of routes in a first topology. The method comprises capturing a plurality of images of each route of the network and the object by a plurality of image capturing devices, wherein the images of each route of the network and the object are captured by two or more image capturing devices. The method further comprises processing the captured images by the plurality of image capturing devices to create one or more delta files and sending the delta files to a central control unit. The method also comprises constructing a map of the network of routes and an obstruction matrix function by the central control unit, wherein the obstruction matrix function indicates the availability and obstruction of various routes of the network at different points of time. The method further comprises generating control signals by the central control unit for controlling the movement of the object within the network of routes and sending the control signals by the central control unit to the object.

BRIEF DESCRIPTION OF THE FIGURES

For a better understanding of the embodiments and to show how it may be carried into effect, reference will now be made, purely by way of example, to the accompanying drawings.

With specific reference now to the drawings in detail, it is stressed that the particulars shown are by way of example and for purposes of illustrative discussion of selected embodiments only, and are presented in the cause of providing what is believed to be the most useful and readily understood description of the principles and conceptual aspects. In this regard, no attempt is made to show structural details in more detail than is necessary for a fundamental understanding; the description taken with the drawings making apparent to those skilled in the art how the several selected embodiments may be put into practice.

As used in this specification, the singular indefinite articles "a", "an", and the definite article "the" should be considered to include or otherwise cover both single and plural referents unless the content clearly dictates otherwise. In other words, these articles are applicable to one or more referents. As used in this specification, the term "or" is generally employed to include or otherwise cover "and/or" unless the content clearly dictates otherwise.

Figure 1:
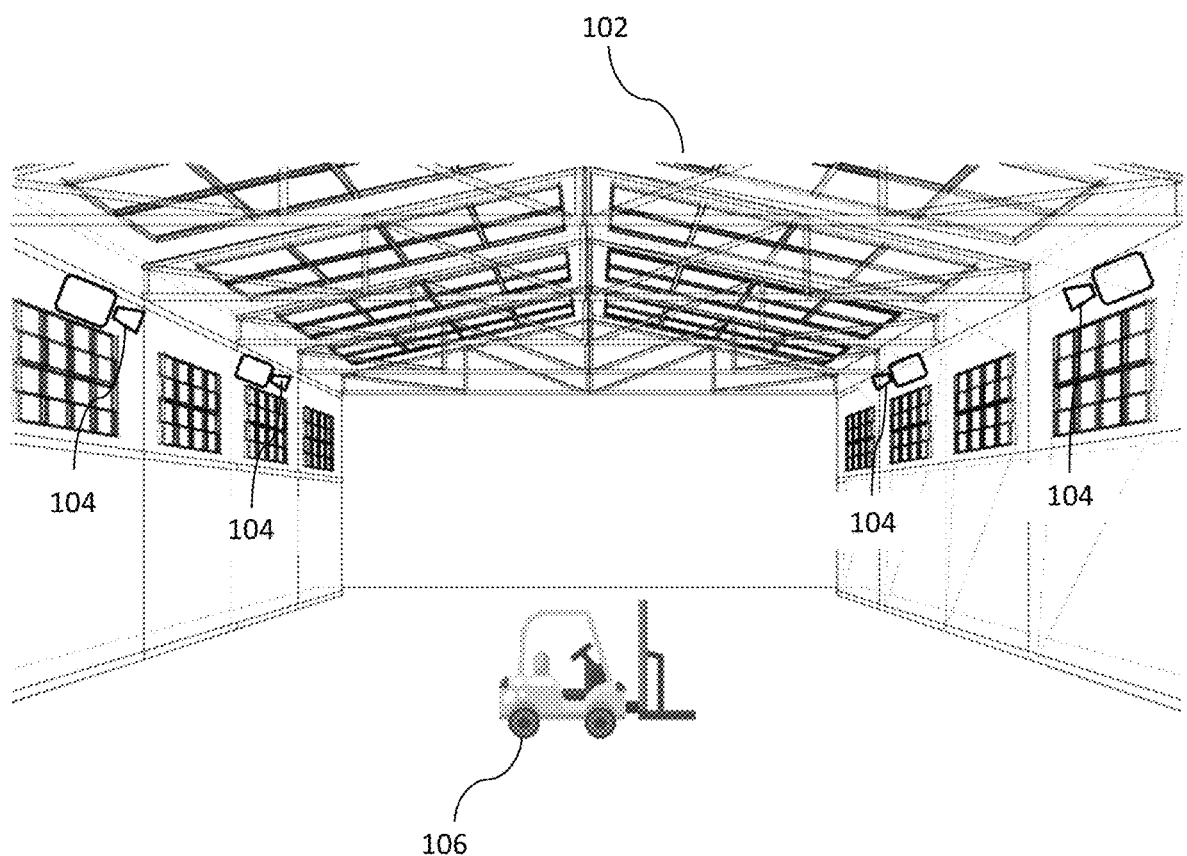
Figure 2:
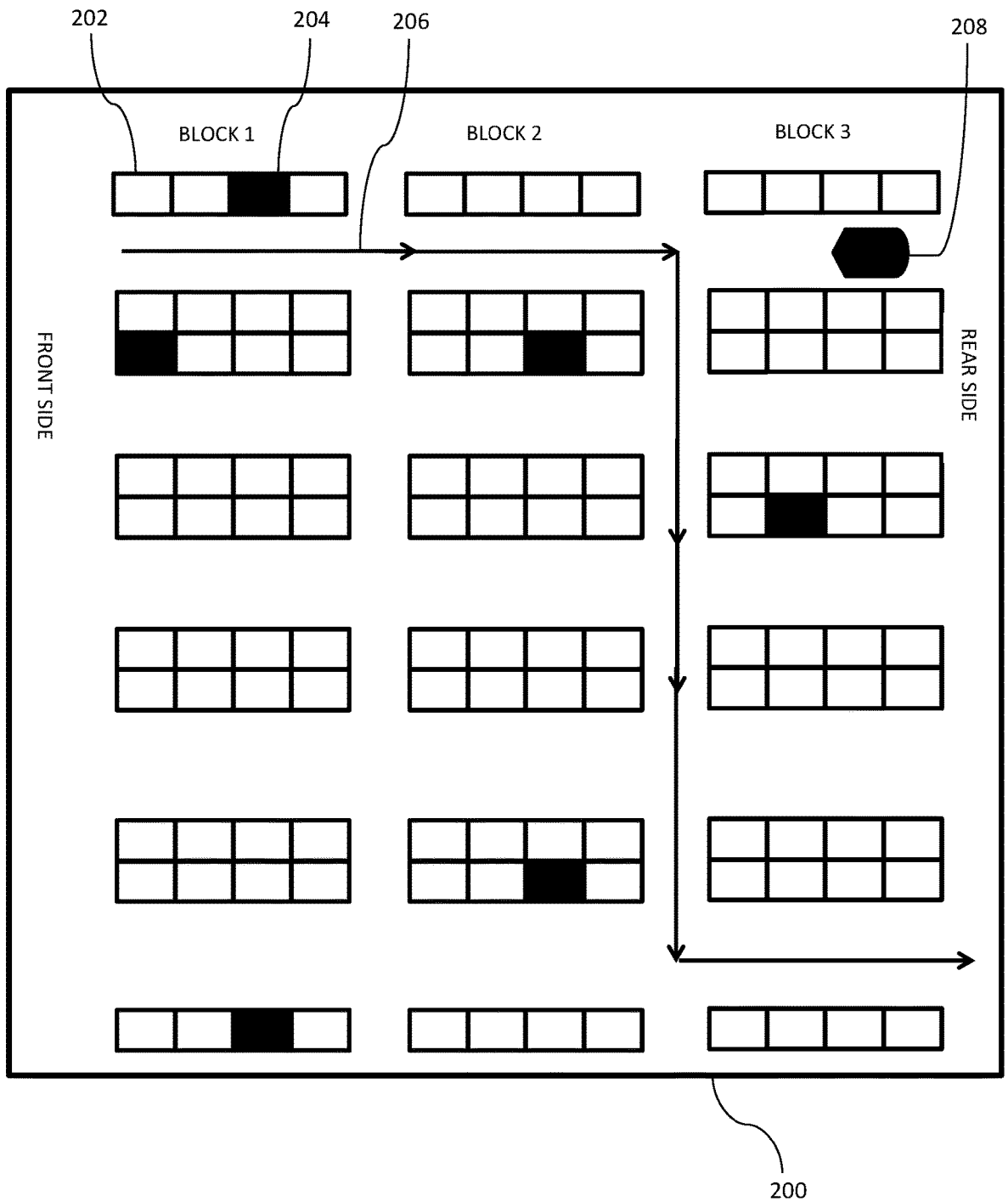
Figure 3:
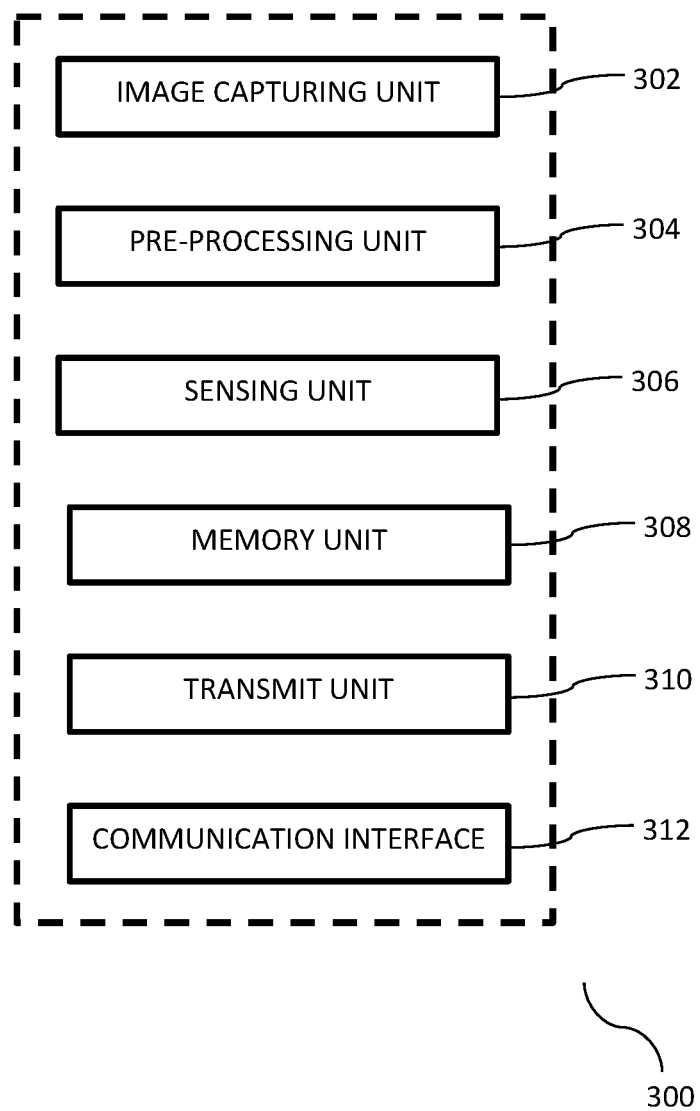
Figure 4:
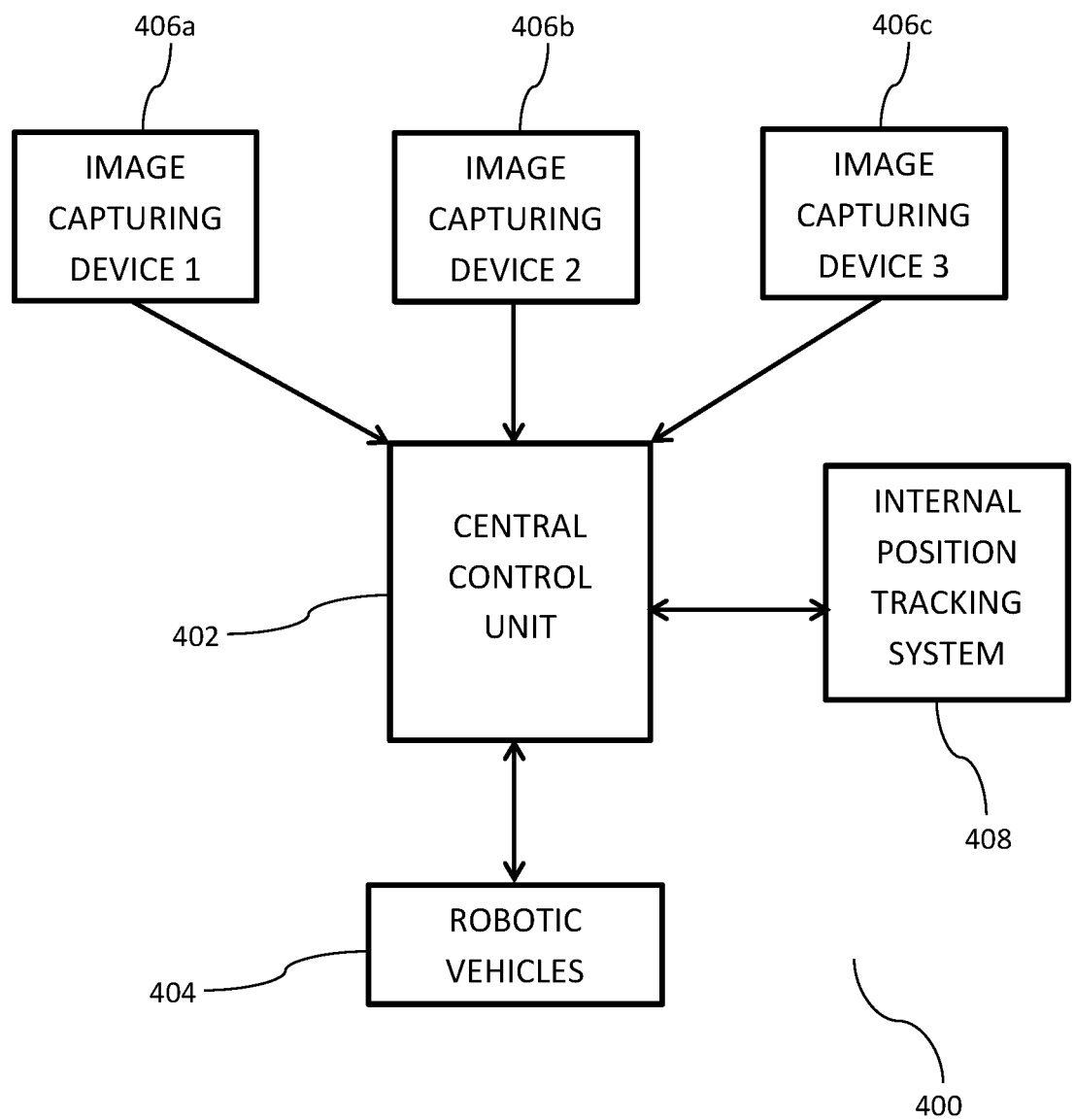
Figure 5A:
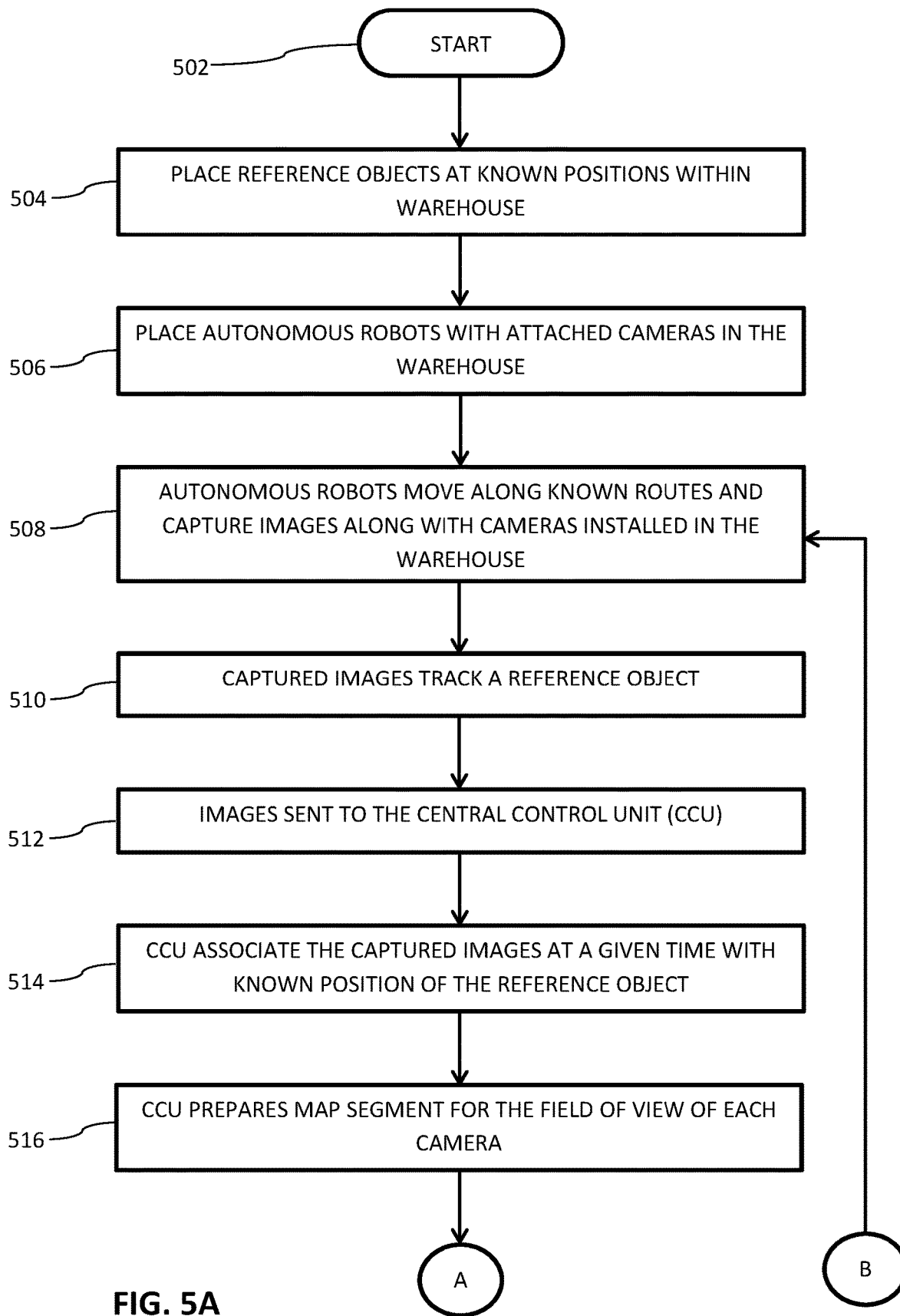
Figure 5B:
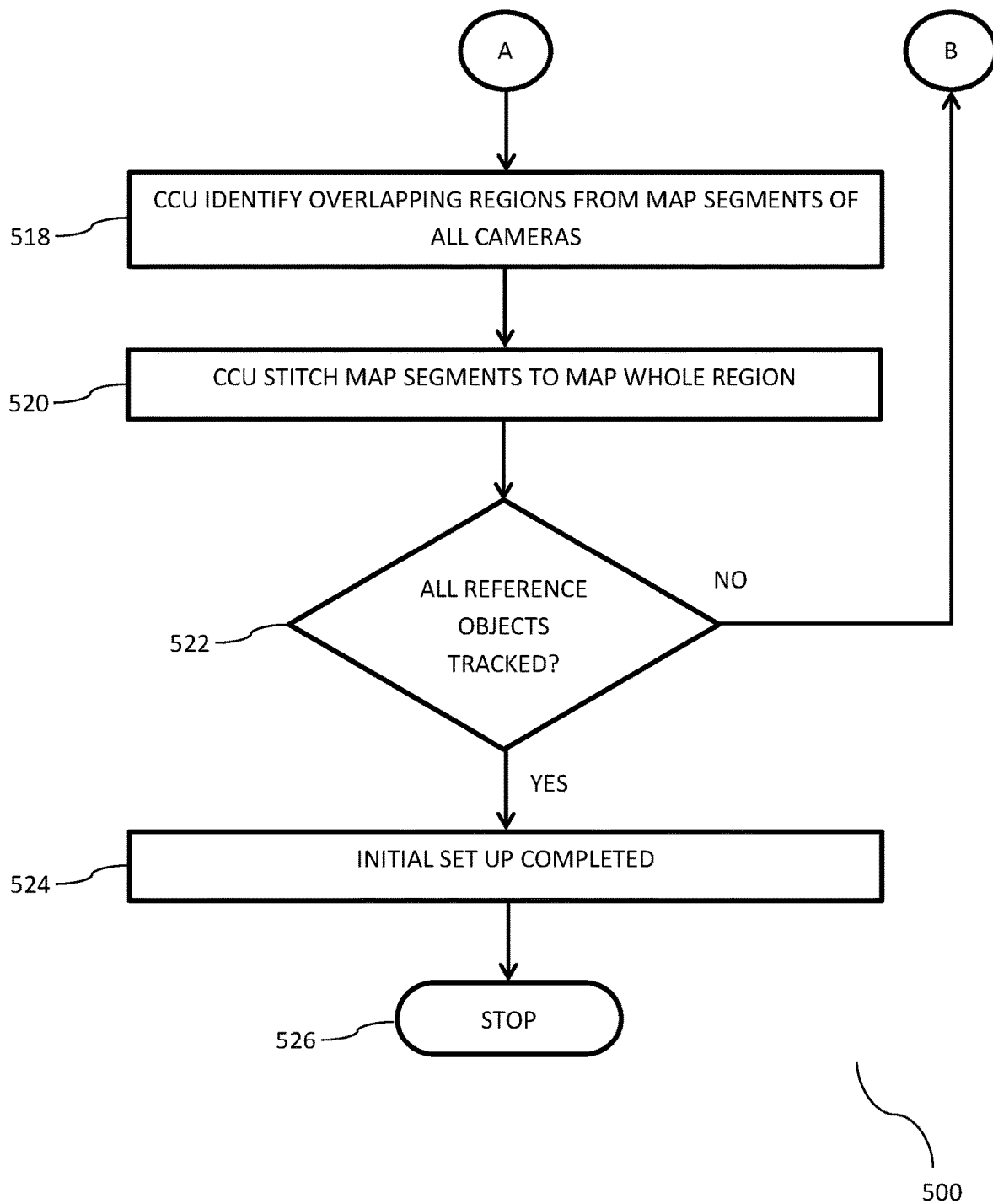
Figure 6A:
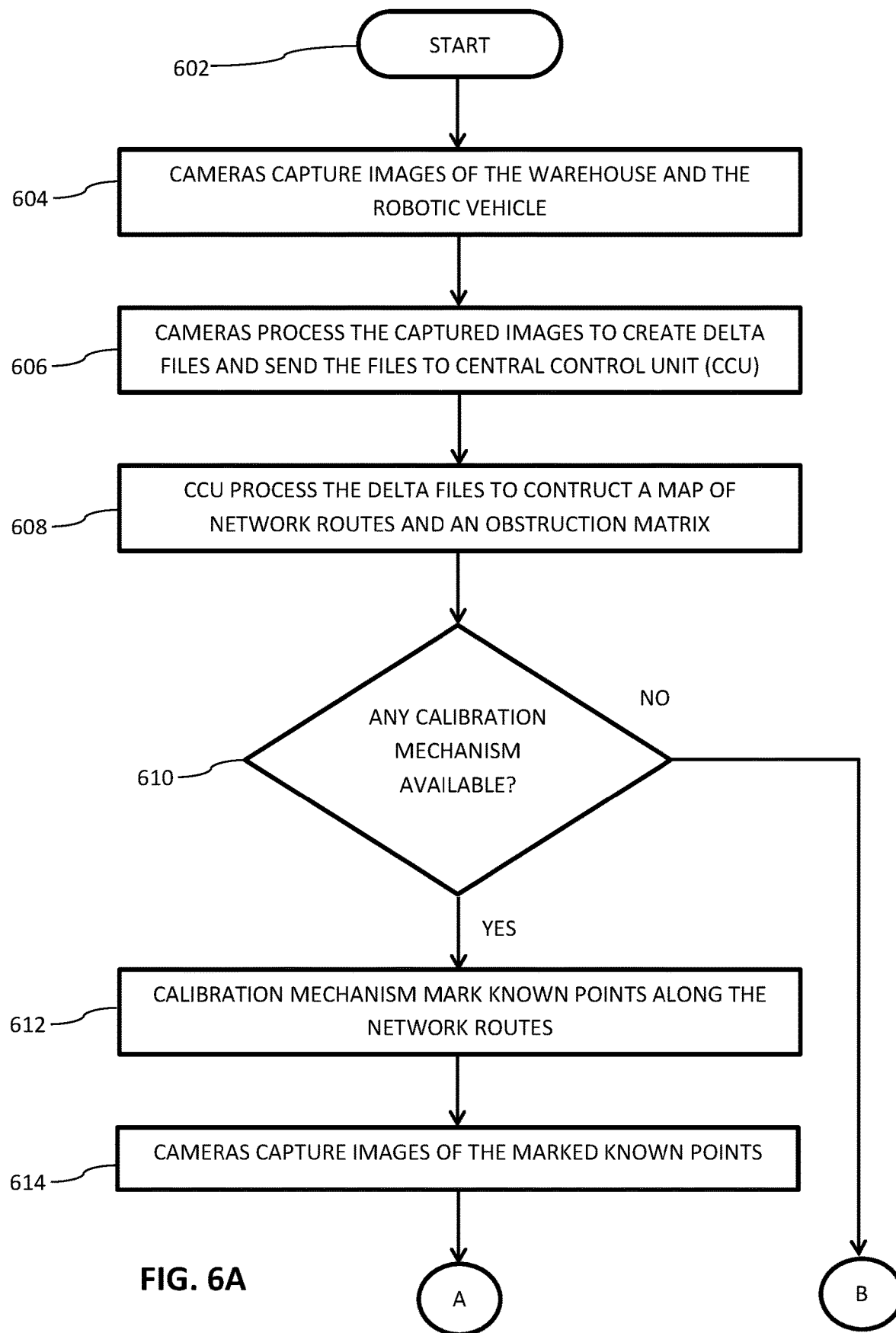
Figure 6B:
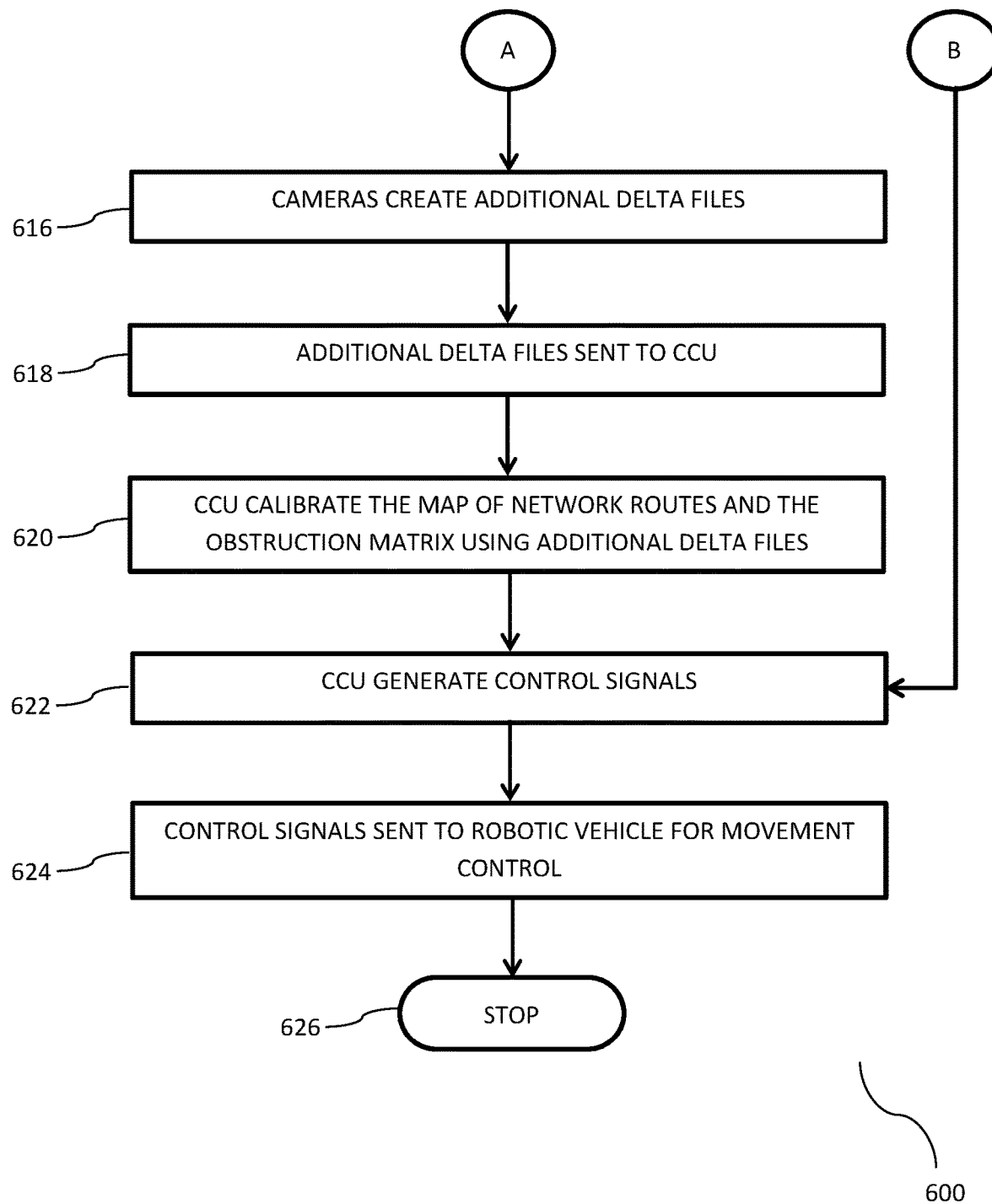
Figure 7:
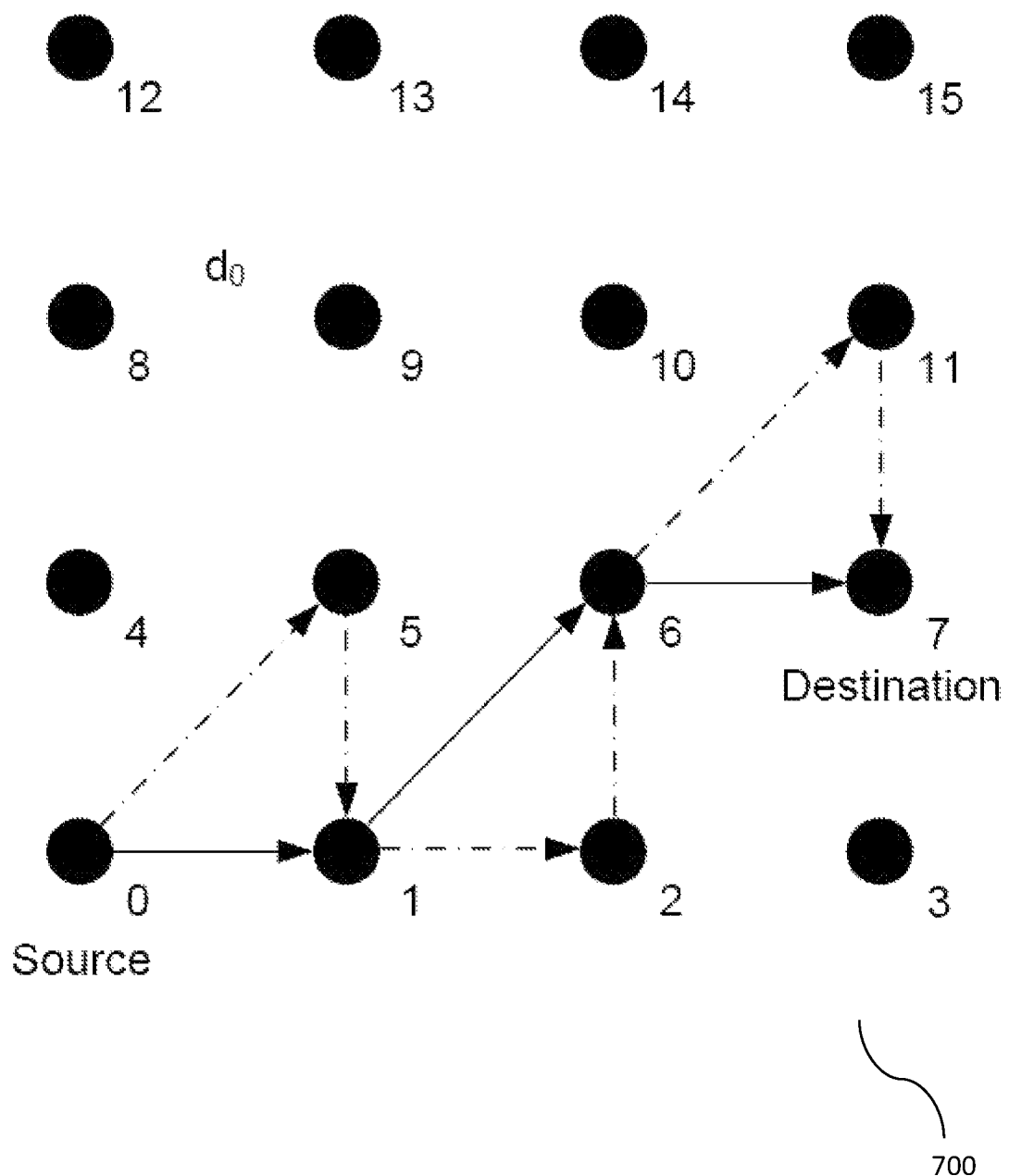
Figure 8:
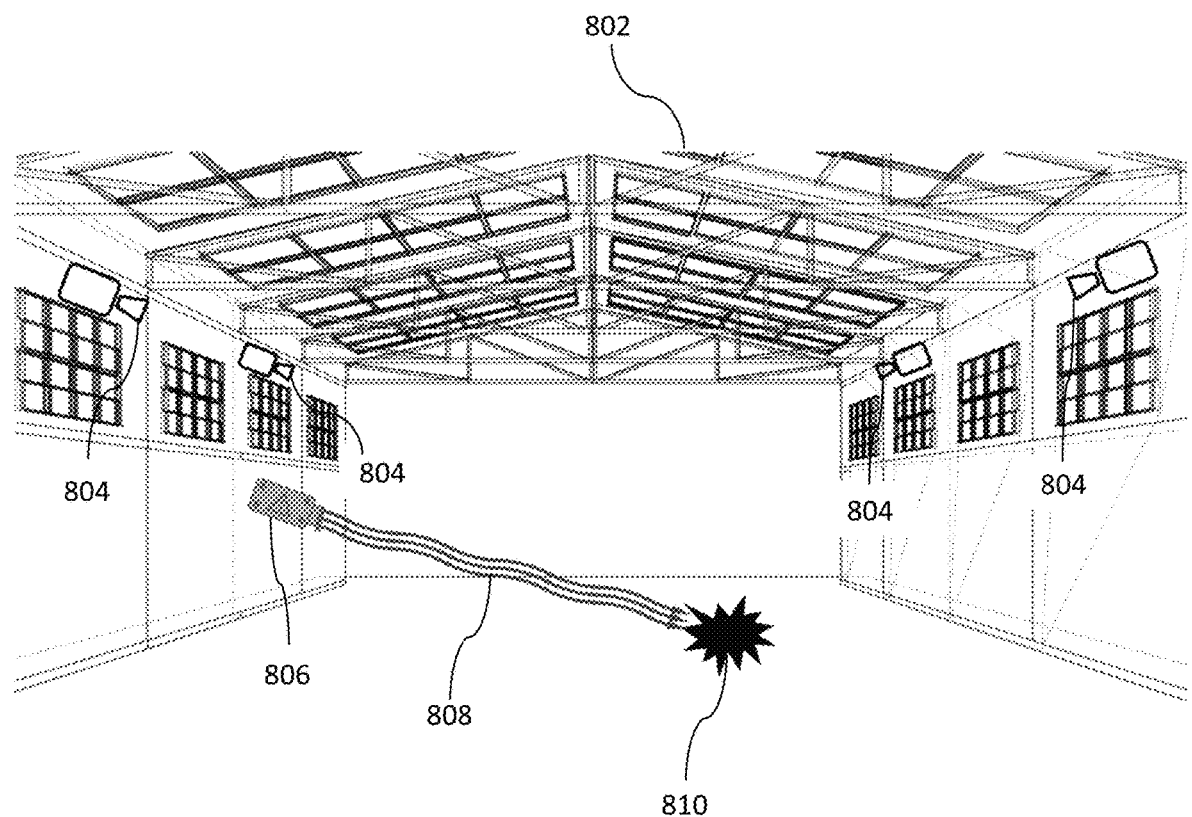
Figure 9:
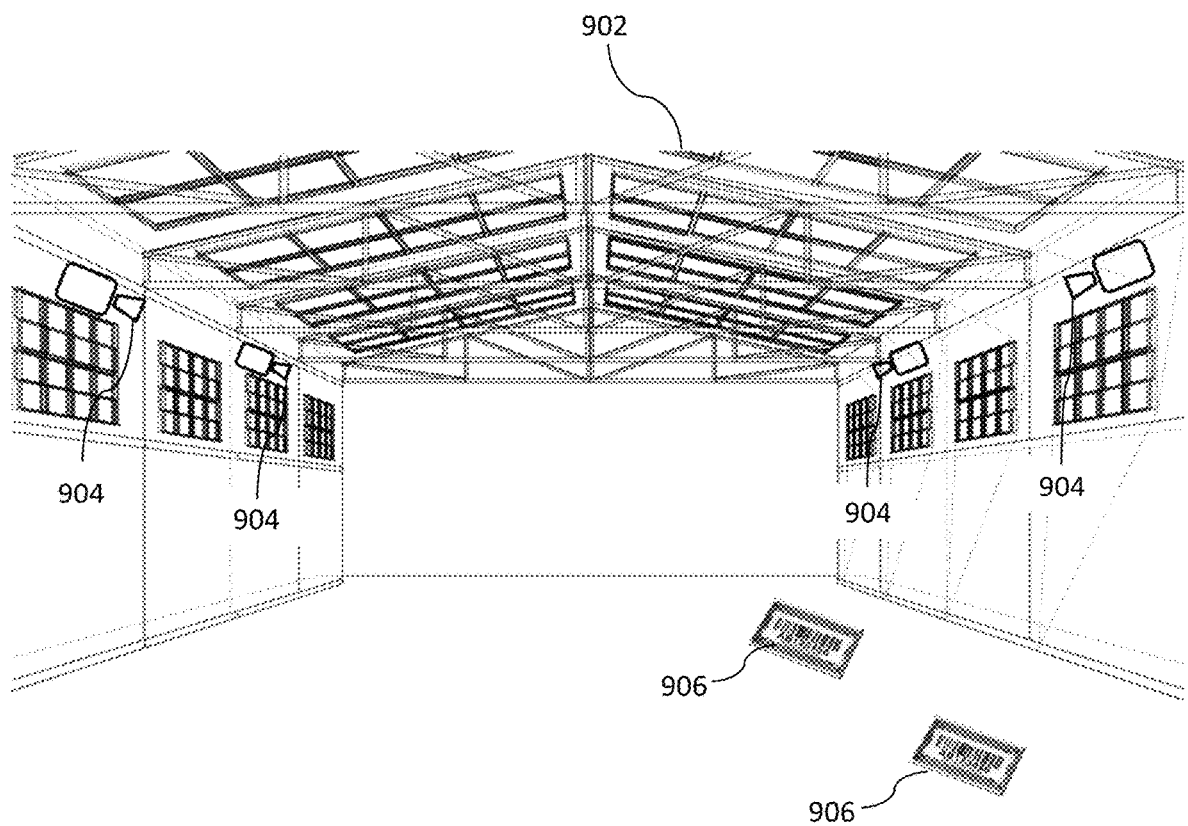

In the accompanying drawings:

FIG. 1 illustrates a schematic view of a warehouse establishment with installed cameras;

FIG. 2 illustrates a schematic grid network layout of the warehouse establishment;

FIG. 3 illustrates the system components of the camera;

FIG. 4 illustrates a block diagram of system components of a Warehouse Central Management System;

FIGS. 5A and 5B illustrate a flowchart representing a method for mapping the warehouse regions during a set up phase;

FIGS. 6A and 6B illustrate a flowchart representing a method for controlling the movement of robotic vehicles within the warehouse establishment;

FIG. 7 illustrates an exemplary map of network routes in a grid network layout for movement of the robotic vehicle from a source point to a destination point;

FIG. 8 illustrates a calibration mechanism using directional laser beams;

FIG. 9 illustrates a calibration mechanism using barcode sign markers; and

Figure 10:
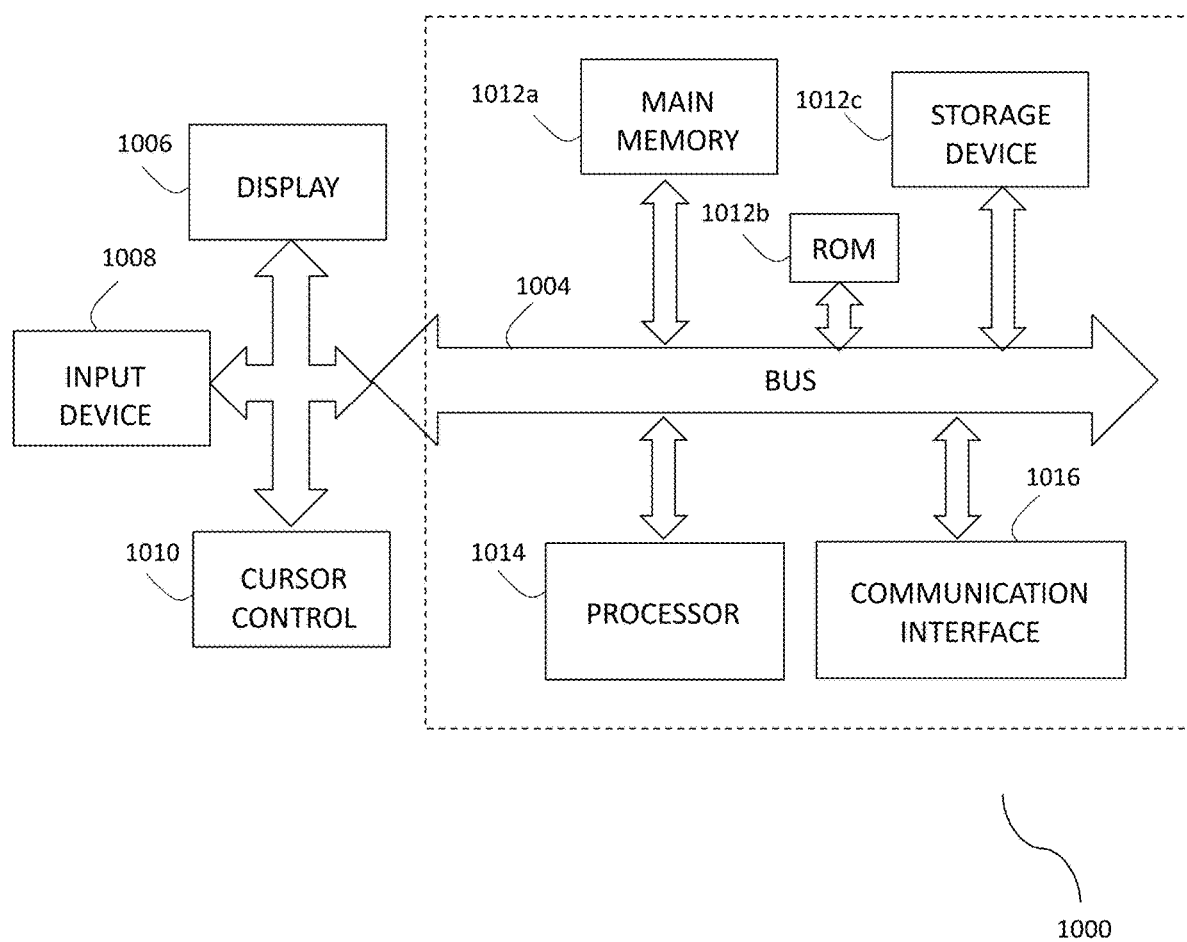

FIG. 10 is a block diagram illustrating the basic components of a Central Control Unit.

DESCRIPTION OF THE SELECTED EMBODIMENTS

Aspects of the present disclosure relate to systems and methods for providing centralized management of a multiple autonomous vehicles within a network of route ways. Control of multiple autonomous vehicles may be provided thereby, even if the autonomous vehicles provide no active feedback.

As required, detailed embodiments of the present invention are disclosed herein; however, it is to be understood that the disclosed embodiments are merely examples of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As appropriate, in various embodiments of the disclosure, one or more tasks as described herein may be performed by a data processor, such as a computing platform or distributed computing system for executing a plurality of instructions. Optionally, the data processor includes or accesses a volatile memory for storing instructions, data or the like. Additionally or alternatively, the data processor may access a non-volatile storage, for example, a magnetic hard disk, flash-drive, removable media or the like, for storing instructions and/or data.

It is particularly noted that the systems and methods of the disclosure herein may not be limited in its application to the details of construction and the arrangement of the components or methods set forth in the description or illustrated in the drawings and examples. The systems and methods of the disclosure may be capable of other embodiments, or of being practiced and carried out in various ways and technologies.

Alternative methods and materials similar or equivalent to those described herein may be used in the practice or testing of embodiments of the disclosure. Nevertheless, particular methods and materials described herein for illustrative purposes only. The materials, methods, and examples not intended to be necessarily limiting. Accordingly, various embodiments may omit, substitute, or add various procedures or components as appropriate. For instance, the methods may be performed in an order different from described, and that various steps may be added, omitted or combined. In addition, aspects and components described with respect to certain embodiments may be combined in various other embodiments.

FIG. 1 illustrates a schematic view of a warehouse establishment 102 in accordance with an embodiment of the invention. The warehouse establishment 102 is typically a large enclosed space used for production, storage, distribution and shipment of large quantity of items. The warehouse establishment 102 can be a shopping mall, a factory, a manufacturing unit, an assembling unit, a distribution unit or a cargo unit.

The warehouse establishment 102 has multiple cameras 104 installed at various locations. Four cameras 104 are shown installed in the warehouse establishment 102. It should be clearly understood to a person skilled in the art that any number of cameras can be used in the warehouse establishment 102 without limiting the scope of the invention. The group of all the cameras 104 within the warehouse establishment 102 will be called as "camera network". The cameras 104 are located in such a manner to provide coverage over the entire area of the warehouse establishment 102. The cameras 104 capture images of various points of the warehouse establishment 102 at regular interval of times. To provide redundancy in camera network and maintain the work flow, the images of each point within the warehouse establishment 102 can be captures by two or more cameras 104. For example, in a grid network layout as shown in FIG. 2, cameras 104 can be directed along straight paths to cover the entire area of the warehouse establishment 102. In another exemplary layout of multiple rings (not shown), the cameras 104 can be installed at the periphery of each ring.

Exemplary cameras 104 includes an analog or digital still image camera, a video camera, an optical camera, a laser camera, a laser or a 3D image scanner, or any other device capable of capturing high resolution images of the warehouse establishment 102. The cameras 104 capture images of the warehouse establishment 102 in a still image format, a flash image format or a video image format. The preferred still images can be in JPEG, GIF, PNG or any suitable format which enables the processing of captured images. The video format of the captured images may be based on one out of: TIFF (Tagged Image File Format), RAW format, AVI, DV, MOV, WMV, MP4, DCF (Design Rule for Camera Format), ITU-T H.261, ITU-T H.263, ITU-T H.264, ITU-T CCIR 601, ASF, Exif (Exchangeable Image File Format), and DPOF (Digital Print Order Format) standards.

A robotic vehicle 106 is shown in FIG. 1. The robotic vehicle 106 can be a semi-autonomous vehicle, an autonomous vehicle, a robotic device or a shopping cart.

The system components of the camera 300 are shown in FIG. 3. The cameras 300 comprises an image capturing unit 302 to capture images of various points of the warehouse establishment 102 and the robotic vehicle 106 automatically at regular interval of time. Alternatively, the image capturing unit 302 can be controlled by a manual input to capture images at specific times. For example, in case a certain part of the warehouse establishment 102 is non-operational during a part of the day, the cameras 300 in that part of the warehouse establishment 102 can be kept off. Alternatively, the camera 300 can comprise of a sensing unit 306 such as motion sensor to capture images of the warehouse establishment 102 only on sensing a movement. Further, the cameras 300 can be programmed to automatically adjust their image capturing intervals based on sensing movements within their imaging area.

The captured images can be processed by a pre-processing unit 304 of the camera 300 to create one or more delta files, inter frame stream or the like such as used in video compression. The pre-processing unit 304 used herein to include, but not limited to, any integrated circuit or other electronic device (or collection of devices) capable of performing an operation on at least one instruction, including, without limitation, Reduced Instruction Set Core (RISC) processors, CISC microprocessors, Microcontroller Units (MCUs), CISC-based Central Processing Units (CPUs), and Digital Signal Processors (DSPs).

The captured images are stored in a memory unit 308 of the camera 300. The memory unit 308 includes a Random Access Memory (RAM) or other dynamic storage device, a Read Only Memory (ROM) (or other non-volatile memory) or other static storage device, a magnetic disk drive, and an optical disk drive for storing information and instructions to be executed by the pre-processing unit 304.

The camera 300 also includes a transmit unit 310 for transmitting the delta files to a central control unit 402 for further processing as shown in FIGS. 3 and 4. A communication interface 312 enables the camera 300 to communicate with other cameras 300 and the central control unit 402. The communication network between the cameras 300, robotic vehicle 106 and the central control unit 402 can be a Wired Local Area Network (LAN) connection, a Wireless LAN connection, a wireless radio frequency (RF) internet connection (e.g., Wi-Fi™), a short-range wireless connection (e.g., Bluetooth®), a low-power wireless machine-to-machine connection (e.g., Zigbee®), a source-routed mesh network connection (e.g., Z-Wave®) or an Ethernet connection. Exemplary communication interface 312 may be an Integrated Services Digital Network (ISDN) card or a modem to provide a data communication connection to a corresponding type of telephone line. As another non-limiting example, the communication interface 312 may be a local area network (LAN) card to provide a data communication connection to a compatible LAN. The communication networks and communication interface 312 disclosed above are exemplary in nature and should not limit the scope of the invention.

In a camera network with redundancy, the cameras 300 communicate with each other to inform others of their operational health. This can be achieved by sending "hello messages" within the camera network at regular intervals. In case of proper functioning of the camera network, with all cameras 300 in working state, some of the cameras 300 can be kept in a semi-active state. These semi-active cameras 300 can capture the images of the warehouse establishment 102 and the robotic vehicle 106, however, will not process the images to create delta files. This will help to save the resources and reduces cost. In case of an error in a particular camera, a redundant camera takes over to create delta files and transmit them to the central control unit 402.

FIG. 2 illustrates a schematic grid network layout 200 of the warehouse establishment 102. The grid network layout 200 comprises of a system of aisles that make it easier to move around the warehouse establishment 102. The blocks 202 indicate various shelves placed in the warehouse establishment 102. The "black block" 204 shows exemplary items which are intended to be picked by the robotic vehicle 106 for delivery to a customer. A route 206 can be taken by the robotic vehicle 106 to navigate within the warehouse establishment 102 to pick the items 204 and reach the desired destination. The other topologies of the warehouse establishment 102 can be a grid topology, a mesh topology, a linear topology or a ring topology, without limiting the scope of the invention.

FIG. 4 illustrates a block diagram of system components of a Warehouse Central Management System 400. The Warehouse Central Management System 400 includes a central control unit 402 which controls the movement of robotic vehicles 404 within the warehouse establishment 102. The robotic vehicles 404 can also communicate with the central control unit 402 to indicate any error in the functionality of the robotic vehicle 404. Further, in case the robotic vehicle 404 encounters an obstacle or an unexpected hazard in the movement path, it communicates with the central control unit 402. An internal position tracking system 408 may be used to map the region of the warehouse establishment 102 during an initial setup phase. The internal position tracking system 408 may be a real-time location system (RTLS) as known in the art for indoor tracking, such as available from Marvelmind, Pozyx®, Sewio or the like, and may be used to map the region of the warehouse establishment 102.

FIGS. 5A and 5B illustrates a flowchart 500 representing a method for mapping the warehouse regions during an initial set up phase using the internal position tracking system 408. The process starts at step 502 by placing reference objects at known positions within the warehouse establishment 102 at step 504. The reference objects can be stationary or moving items within a specific region of the warehouse establishment 102. The position or moving region of the reference objects is known in advance and stored in the central control unit 402. The position of the reference object, for example, can be defined in terms of 'x' and 'y' coordinates within a particular area of the warehouse establishment 102. Alternatively, the position of the reference object can also be defined with respect to the shelves. At step 506, a number of autonomous robots with attached cameras are placed in the warehouse establishment 102. At step 508, these autonomous robots move along known routes within the warehouse establishment 102 and capture images including images of the reference objects. The images can also be captured by the cameras 406a, 406b and 406c along with the autonomous robots. Alternatively, the images of the warehouse establishment 102 and the reference objects can be captured only by the cameras 406a, 406b and 406c without the involvement of autonomous robots. At step 510, a reference object is tracked in the captured images. The autonomous robot sends the captured images of the reference object to the central control unit 402 at step 512. Multiple autonomous robots capturing the images of the same reference object will send the images to the central control unit 402. At step 514, the central control unit 402 associates the captured images of the reference object at a given time with known position of the reference object. At step 516, the central control unit 402 prepares map segments for the field of view of the cameras of each autonomous robot using the known position of the reference object. Using the multiple images of the same reference object, the central control unit 402 identifies overlapping regions from the map segments of all the cameras at step 518. At step 520, the central control unit 402 stitch map segments to map the whole region. At step 522, the central control unit 402 checks if all the reference objects placed in the warehouse establishment 102 have been imaged and tracked by the autonomous robot. If 'yes', the initial setup process is completed at step 524 and the process stops at step 526. In case, all the reference objects placed in the warehouse establishment 102 have not been imaged and tracked by the autonomous robot, the process goes to step 508 repeating the subsequent steps until all the reference objects have been tracked and whole of the area of warehouse establishment 102 have been mapped.

In some systems, the calibration mechanism may include a reference object carrying an internal position tracker. Such a reference object may be viewed by the video cameras as it travels around within the area. The calibration mechanism may use the internal position tracker to record the actual position of the reference object at each point in time. For each video camera, the apparent position of the reference object within a captured frame maybe mapped to the known actual position of the reference object at the time when the frame was captured.

FIGS. 6A and 6B illustrates a flowchart showing a method for movement control of the robotic vehicles 404. The process starts at step 602 with the cameras 406a, 406b and 406c capturing images of the warehouse establishment 102 and the robotic vehicle 404 at step 604. The cameras 406a, 406b and 406c, at step 606, process the captured images to create delta files and send the delta files to the central control unit (CCU) 402. At step 608, the central control unit (CCU) 402 processes the received delta files from the cameras 406a, 406b and 406c and construct a map of network routes and an obstruction matrix. Referring to FIG. 2, a network route 206 is shown in the grid network layout of the warehouse establishment 102. The map of network routes includes all possible routes within the grid network layout. FIG. 7 illustrates an exemplary map 700 of network routes in a grid network layout for movement of the robotic vehicle 404 from a source point to a destination point. A number of possible routes have been shown in the exemplary map 700 between the source and destination points. In a particular embodiment of the present invention, the map of network routes can also mark an optimum route between the source and destination points. The obstruction matrix includes any obstacle (e.g., obstacle $d_0$ of FIG. 7) placed within a route. An obstacle 208 present in Block 3 is shown in FIG. 2. The obstacle can be an item fallen off from a shelf, a tool or a machine placed by a manual worker, a broken installation fallen off from the warehouse roof or any other object which can obstruct the free movement of robotic vehicles 404. The obstruction matrix illustrates can also include the description of obstacle(s) present within the routes. For example, it can describe the size, placement or the type of the obstacle.

At step 610, the central control unit (CCU) 402 verifies if any calibration mechanism is available in the warehouse establishment 102. If a calibration mechanism is not available, the process continues to generating control signals via the CCU, further discussed herein with respect to step 622. The calibration mechanism enables the central control unit 402 to calibrate the map of the network of routes and the obstruction matrix function by marking one of more known points along the network of routes. The calibration mechanism can include of one or more mirror galvanometers placed within the warehouse establishment 102 to mark points along the network of routes using directional laser beams at step 612. FIG. 8 illustrates a mirror galvanometer 806 emitting directional laser beams 808 to mark a point 810 on the floor of the warehouse establishment 802. The calibration mechanism can also include projected tracer beams of electromagnetic radiation such as visible light beams, infrared beams or ultraviolet beams. Further the calibration mechanism can include ultrasonic beacons which enable the points to be marked along the network of routes. Moreover, the calibration mechanism can include sign markers such as bar codes or QR codes provided along the network of routes. Various standard barcodes can be used including EAN-8, EAN-13, UPC-A, UPC-E, EAN/UPC Add-on, Code-39, Code-32, CC/EAN/Code-128 Industrial-25, Interleaved-25, Martix-25, Codabar/Nw7, MSI/Plessey, etc. FIG. 9 illustrates a calibration mechanism using barcodes sign marker 906 marked on the floor of the warehouse establishment 902. Also, the calibration mechanism can include RFID tagged items placed along the network of routes in the warehouse establishment 102.

The positions of the marked points 810 and 906 are known to the central control unit 402. At step 614, the cameras 804 (or 904) capture images of the marked points 810 and 906 and create additional delta files at step 616. The additional delta files are sent to the central control unit 402 at step 618. The central control unit 402 calibrates the map of network routes and the obstruction matrix using the additional delta files at step 620. The central control unit 402 generates control signals at step 622 and the sends the control signals to the robotic vehicles 404 for navigating within the warehouse establishment 102 at step 624. The control signals guide the robotic vehicles 404 for items pickup, the route to the delivery point and to change the route in case of any obstacle within the original route. The process stops at step 626.

In a particular embodiment of the present invention, the robotic vehicles 404 can include a safety override mechanism The safety override mechanism enables the robotic vehicles 404 to control itself autonomously and independently in case of detecting an obstacle or an unexpected hazard in a path of the object movement along a route of the network. The safety override mechanism enables the robotic vehicles 404 to control itself without requiring inputs from the central control unit 402. For example, in a particular case when an item suddenly falls off (from a shelf) in front of the robotic vehicle 404. The safety override mechanism can include a sensing device which enables the object to detect the obstacle or the unexpected hazard in the movement path. An additional controlling device of the safety override mechanism enables the robotic vehicle 404 to find an alternative path to the destination point.

FIG. 10 is a block diagram illustrating the basic components of the Central Control Unit 1000. The central control unit 1000 can be a portable electronic device such as a desktop computer, a laptop computer, a digital notebook, a cellular phone, a Personal Digital Assistant (PDA), an image processing device (e.g., a digital camera or video recorder), and/or any other handheld or fixed location computing devices, or a combination of any of these devices. The central control unit 1000 can further be a client device, a server device, or a routing/switching device. The central control unit 1000 includes a bus 1004, an interconnect 1016, or other communication mechanism for communicating information, and a processor 1014, commonly in the form of an integrated circuit, coupled to the bus 1004 for processing information and for executing the computer executable instructions. The central control unit 1000 also includes a main memory 1012a, such as a Random Access Memory (RAM) or other dynamic storage device, coupled to bus 1004 for storing information and instructions to be executed by the processor 1014. Main memory 1012a also may be used for storing temporary variables or other intermediate information during execution of instructions to be executed by processor 1014. The central control unit 1000 further includes a Read Only Memory (ROM) 1012b (or other non-volatile memory) or other static storage device coupled to the bus 1004 for storing static information and instructions for the processor 1014. A storage device 1012c, such as a magnetic disk or optical disk, a hard disk drive (HDD) for reading from and writing to a hard disk, a magnetic disk drive for reading from and writing to a magnetic disk, and/or an optical disk drive (such as DVD) for reading from and writing to a removable optical disk, is coupled to bus 1004 for storing information and instructions. Typically, the central control unit 1000 includes an Operating System (OS) stored in a non-volatile storage for managing the computer resources and provides the applications and programs with an access to the computer resources and interfaces. Non-limiting examples of operating systems are Microsoft® Windows®, Mac OS® X, and Linux®.

The term "processor" is used herein to include, but not limited to, any integrated circuit or other electronic device (or collection of devices) capable of performing an operation on at least one instruction, including, without limitation, Reduced Instruction Set Core (RISC) processors, CISC microprocessors, Microcontroller Units (MCUs), CISC-based Central Processing Units (CPUs), and Digital Signal Processors (DSPs).

The central control unit 1000 may be coupled via the bus 1004 to a display 1006, such as a Cathode Ray Tube (CRT), a Liquid Crystal Display (LCD), a flat screen monitor, a touch screen monitor or similar means for displaying text and graphical data to a user. The display 1006 allows a user to view, enter, and/or edit information that is relevant to the operation of the system. An input device 1008, including alphanumeric and other keys, is coupled to the bus 1006 for communicating information and command selections to the processor 1014. Another type of user input device is a cursor control 1010, such as a mouse, a trackball, or cursor direction keys for communicating direction information and command selections to the processor 1014 and for controlling cursor movement on the display 1006. The input device 1008 may further be a touch input device such as a mouse, pen, or trackball, a voice input device, a scanning device, or another device that provides input to the processor 1014.

The central control unit 1000 includes a communication interface 1016 coupled to the bus 1004. The communication interface 1016 provides a two-way data communication with the robotic vehicles 404 and the cameras 406a, 406b and 406c. For example, the communication interface 1016 may be an Integrated Services Digital Network (ISDN) card or a modem to provide a data communication connection to a corresponding type of telephone line. As another non-limiting example, the communication interface 1016 may be a local area network (LAN) card to provide a data communication connection to a compatible LAN. For example, Ethernet based connection based on IEEE802.3 standard may be used.

Technical and scientific terms used herein should have the same meaning as commonly understood by one of ordinary skill in the art to which the disclosure pertains. Nevertheless, it is expected that during the life of a patent maturing from this application many relevant systems and methods will be developed. Accordingly, the scope of the terms such as computing unit, network, display, memory, server and the like intended to include all such new technologies a priori.

As used herein the term "about" refers to at least ±10%. The terms "comprises", "comprising", "includes", "including", "having" and their conjugates mean "including but not limited to" and indicate that the components listed are included, but not generally to the exclusion of other components. Such terms encompass the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" may include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. It should be understood, therefore, that the description in range format is merely for convenience and brevity and should not be construed as an inflexible limitation on the scope of the disclosure. Accordingly, the description of a range should be considered to have specifically disclosed all the possible sub-ranges as well as individual numerical values within that range. For example, description of a range such as from 1 to 6, should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6 as well as non-integral intermediate values. This applies regardless of the breadth of the range.

It is appreciated that certain features of the invention, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

Although the invention has been described in conjunction with specific embodiments thereof, it is evident that other alternatives, modifications, variations and equivalents will be apparent to those skilled in the art. Accordingly, it is intended to embrace all such alternatives, modifications, variations and equivalents that fall within the spirit of the invention and the broad scope of the appended claims. Additionally, the various embodiments set forth hereinabove are described in terms of exemplary block diagrams, flow charts and other illustrations. As will be apparent to those of ordinary skill in the art, the illustrated embodiments and their various alternatives may be implemented without confinement to the illustrated examples. For example, a block diagram and the accompanying description should not be construed as mandating a particular architecture, layout or configuration.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer-readable medium such as a storage medium. Processors may perform the necessary tasks.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting. The scope of the disclosed subject matter is defined by the appended claims and includes both combinations and sub combinations of the various features described hereinabove as well as variations and modifications thereof, which would occur to persons skilled in the art upon reading the foregoing description.

The invention claimed is:

1. A system for managing a movement of an object within an area, wherein the area comprises a network of routes in a first topology, the system comprising:
   a plurality of image capturing devices located at multiple locations along the network of routes, wherein images of each route of the network and the object is captured by two or more image capturing devices, each of the image capturing devices comprising:
      a pre-processor unit which processes the captured images and creates one or more delta files for each captured image;
   a central control unit, the central control unit comprising:
      a first communication interface for communicating with the plurality of image capturing devices through a first communication network, wherein the central control unit receives the delta files from the plurality of image capturing devices;
      a second communication interface for communicating with the object through a second communication network, wherein the central control unit communicates with the object to control its movement along the network of routes; and
      a processing unit for:
         constructing a map of the network of routes and an obstruction matrix function, wherein the obstruction matrix function indicates an availability and obstruction of various routes of the network at different points of time; and
generating control signals for controlling the movement of the object within the network of routes; and
a calibration mechanism, wherein the calibration mechanism enables the central control unit to calibrate the map of the network of routes and the obstruction matrix function by marking one or more known points along the network of routes, and wherein the plurality of image capturing devices capture the images of marked known points, create one or more additional delta files and transmit the additional delta files to the central control unit,
wherein the object includes a safety override mechanism which enables the object to control itself autonomously and independently in case of detecting an obstacle or an unexpected hazard in a path of the object movement along a route of the network, the safety override mechanism comprising:
a sensing device which enables the object to detect the obstacle or the unexpected hazard in the path; and
an additional processing unit to enable controlling of the object to identify an alternate movement path.

2. The system of claim 1, wherein the first and the second communication network comprises a Wired LAN connection, a Wireless LAN connection, a wireless radio frequency (RF) internet connection, a short-range wireless connection, a low-power wireless machine-to-machine connection, a source-routed mesh network connection or an Ethernet connection.

3. The system of claim 1, wherein the object comprises a semi-autonomous vehicle, an autonomous vehicle, a robotic device or a shopping cart.

4. The system of claim 1, wherein the area comprises a warehouse, a shopping mall, a factory, a manufacturing unit, an assembling unit, a distribution unit or a cargo unit.

5. The system of claim 1, wherein the plurality of image capturing devices capture the images of the area, the object and the marked known points at regular interval of time.

6. The system of claim 1, wherein the calibration mechanism comprises one or more mirror galvanometers which enable the points to be marked along the network of routes using directional laser beams.

7. The system of claim 1, wherein the calibration mechanism comprises projected tracer beams of electromagnetic radiation such as visible light beams, infrared beams or ultraviolet beams which enable the points to be marked along the network of routes.

8. The system of claim 1, wherein the calibration mechanism comprises ultrasonic beacons which enable the points to be marked along the network of routes.

9. The system of claim 1, wherein the calibration mechanism comprises sign markers including bar codes or QR codes provided along the network of routes.

10. The system of claim 1, wherein the calibration mechanism comprises an internal position tracking system to track one or more reference objects at known positions along various routes of the network, wherein the calibration mechanism is operable to:
capture images of the one or more reference objects;
transmit the captured images to the central control unit;
associate the captured images at a given time with the known positions of reference objects;
prepare map segments for a field of view of each camera, identify overlapping parts from the map segments and stitch the map segments to prepare a map of the area.

11. The system of claim 1, wherein the image capturing devices comprises one or more of an analog still image camera, a digital still image camera, a video camera, an optical camera, a laser camera, a laser or a 3D image scanner.

12. A method for controlling a movement of an object within an area, wherein the area comprises a network of routes in a first topology, the method comprising:
capturing a plurality of images of each route of the network and the object by a plurality of image capturing devices, wherein the images of each route of the network and the object are captured by two or more image capturing devices;
processing the captured images by the plurality of image capturing devices to create one or more delta files;
sending the one or more delta files to a central control unit;
constructing a map of the network of routes and an obstruction matrix function by the central control unit, wherein the obstruction matrix function indicates an availability and obstruction of various routes of the network at different points of time;
calibrating the map of the network of routes and the obstruction matrix function using an internal position tracking system;
generating control signals by the central control unit for controlling the movement of the object within the network of routes; and
sending the control signals by the central control unit to the object,
wherein the internal position tracking system performs the steps of:
capturing images of one or more reference objects placed at known positions along various routes of the network;
transmitting the captured images to the central control unit;
associating the captured images at a given time with the known positions;
preparing map segments for a field of view of each internal position tracking system;
identifying overlapping parts from the map segments; and
stitching the map segments to prepare a map of the area.

13. The method of claim 12, wherein the internal position tracking system comprises one or more autonomous robots, semi-autonomous robots or the plurality of image capturing devices.

14. A method for controlling a movement of an object within an area, wherein the area comprises a network of routes in a first topology, the method comprising:
capturing a plurality of images of each route of the network and the object by a plurality of image capturing devices, wherein the images of each route of the network and the object are captured by two or more image capturing devices;
marking one or more known points along the network of routes;
processing the captured images by the plurality of image capturing devices to create one or more delta files;
sending the one or more delta files to a central control unit;
constructing a map of the network of routes and an obstruction matrix function by the central control unit, wherein the obstruction matrix function indicates an availability and obstruction of various routes of the network at different points of time;

generating control signals by the central control unit for controlling the movement of the object within the network of routes; and sending the control signals by the central control unit to the object wherein the image capturing devices capture the images of one or more marked known points, create one or more additional delta files and transmit the additional delta files to the central control unit.

* * * * *